INVENTOR.
LEONARD A. COHEN
BY
Busser, Smith & Harding
ATTORNEYS

March 16, 1965     L. A. COHEN     3,173,627

COMPOSITE SPACE VEHICLE

Filed March 8, 1963     2 Sheets-Sheet 2

INVENTOR.
LEONARD A. COHEN
BY
Busser, Smith & Harding
ATTORNEYS

United States Patent Office 3,173,627
Patented Mar. 16, 1965

3,173,627
COMPOSITE SPACE VEHICLE
Leonard A. Cohen, 224 Old Lancaster Road, Merion, Pa.
Filed Mar. 8, 1963, Ser. No. 263,818
7 Claims. (Cl. 244—1)

The present invention relates to an improved vehicle system for use in space exploration and, more particularly, this invention relates to a vehicle configuration wherein excursions may be made from the primary space craft without destroying the structural integrity of the primary vehicle. In addition, the present invention relates to a space vehicle system which is particularly designed so as to be compatible with means for substantially increasing the ability of personnel within the vehicle to withstand greatly increased forces of acceleration and deceleration as well as the large gravitational forces encountered in the exploration of celestial bodies having several times the gravitational force of earth.

Referring first to the design of the space vehicle, previous vehicles have relied upon tandem arrangements of separable propulsion and manned sections. As a result of this tandem arrangement, the presently designed vehicles for use in future exploration of the moon, as well as other celestial bodies, require that at least two sections be disengaged from one another in order to launch the manned sections and, in some instances, require that the sections be recoupled in space for the return to earth. Furthermore, some tandem arrangements require that one or more of the sections be rotated end for end before launching the manned section or before being recoupled to the propulsion section for the return trip. In addition, such tandem arrangements make it necessary to place the astronaut within the manned section or capsule while the latter is positioned on top of a multiple stage propulsion section. This involves the necessity of retaining the astronaut within the cramped conditions for extended periods of time during the elaborate count-down procedures required for the launching vehicle which can only be accomplished subsequent to the joinder of the manned and propulsion sections.

It is therefore a primary object of the present invention to provide a space vehicle system wherein the above mentioned problems of the tandem arrangement are entirely or substantially avoided.

In addition, it is another primary object of the present invention to provide a space vehicle system which is specifically designed so as to facilitate the use of means for rotating the personnel within the vehicle during periods of extreme acceleration or deceleration whereby substantially greater forces may be tolerated for greatly extended periods of time. For example, present studies indicate that the degree of gravitational, acceleration or deceleration forces which may be tolerated by a human being vary inversely with respect to the length of time during which such forces are present. That is, although a force of 6 g may be sustained for a period of one minute, a force of no more than 3 g may be sustained for a period of three minutes. The physiological reason for this is that the viscosity of the blood and the relatively large mass of the elastically suspended internal organs present a large amount of inertia which must be overcome by the above indicated forces before damage such as hemorrhaging or other serious effects occur. Thus, the present invention recognizes and effectively utilizes these physiological facts by rotating the astronaut about an axis transverse to the direction of the impinging force so that the effective direction of the force on the blood and internal organs is constantly changed thereby substantially lessening the destructive effect of these forces.

The above objects as well as others more particularly relating to the details of construction and resultant advantages will become more fully apparent from the following description when taken in conjunction with the accompanying drawings in which.

Figure 1:
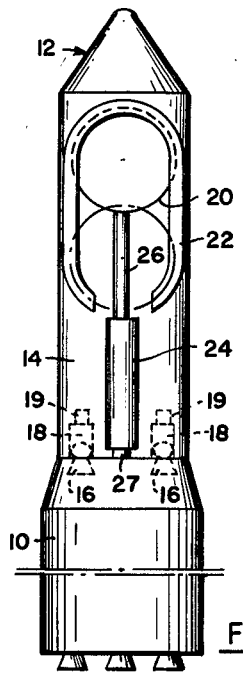
FIGURE 1 is an elevational, plan view of a vehicle system designed in accordance with the principles of the invention, the lower portion of the vehicle system being broken in order to reduce the size of the figure.

Reference is now made to FIGURE 1 which illustrates a preferred form of space vehicle system in accordance with the principles of the present invention. This vehicle system includes a booster propulsion section 10 and a final stage vehicle 12 the latter of which includes a self-containing propellent section 14 and a plurality of moveable nozzles 16. The orientation of nozzles 16 may be varied by pneumatic or hydraulic motors 18 actuated by solenoid operated valves 19 so that the direction of vehicle flight may be varied. Of course, it is to be understood that the booster stage 10 may comprise a plurality of separable stages as is presently well known in the art.

The final stage vehicle 12, hereinafter referred to as the motor vehicle, is provided with a sliding cover plate 20 the peripheral edge of which is secured in longitudinally extending guides 22 as shown most clearly in FIGURE 2. Cover 20 is preferably of circular configuration and is capable of longitudinal movement between the solid line and the dotted line positions shown in FIGURE 1 under the operation of a pneumatic or hydraulic motor 24 connected thereto by a connecting link 26, motor 24 being controlled by a solenoid operated valve 27.

Figure 3:
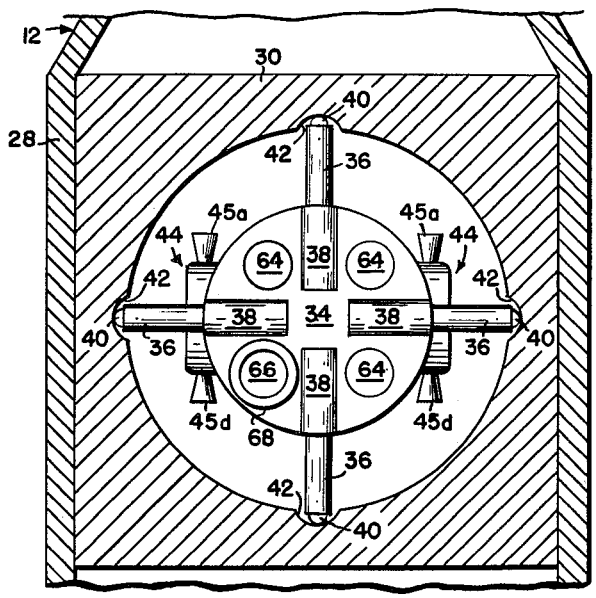
FIGURE 3 is a sectional view taken along the plane indicated by the line 3—3 of FIGURE 2.
Figure 2:
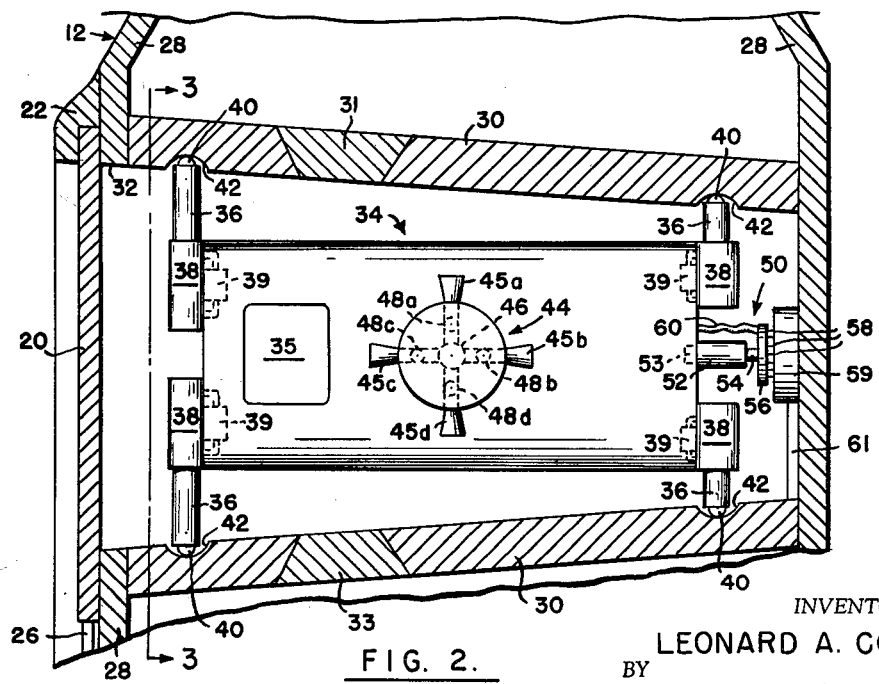
FIGURE 2 is a partly sectional view showing an enlarged portion of the vehicle system.

Referring now to FIGURES 2 and 3, the mother vehicle 12 includes an outer shell 28 within which there is secured a support structure 30 the latter of which defines a conical well in axial alignment with an aperture 32 provided in shell 28. Thus, upon operation of motor 24, hatch 20 may be moved to the dotted line position shown in FIGURE 1 so that access may be gained to the interior of the well formed by the support structure 30.

Support structure 30 is of sufficient size so as to accommodate and support a second vehicle 34 hereinafter referred to as the excursionary vehicle. Although the excursionary vehicle may be of various configurations, it is illustrated as being cylindrical for purposes of the present description. Vehicle 34 is supported within the mother vehicle 12 by means of a plurality of extendible legs 36 located in sets of four at opposite longitudinal ends of the vehicle. Each of legs 36 may be extended and retracted by an associated, double acting, hydraulic or pneumatic motor 38 under the control of a solenoid operated control valve 39. The exterior end of each of legs 36 mounts a ball bearing 40 which, when the leg is extended as shown, is received within a semi-spherical cavity 42 provided in the internal surface of support structure 30. Thus, legs 36 and cavities 42 cooperate to form a disengageable supporting and locking arrangement whereby the excursionary vehicle may be securely locked in position within the mother vehicle, the legs being first retracted when the excursionary vehicle is about to leave or enter the well of the mother ship.

As further shown in FIGURES 2 and 3, the excursionary vehicle includes a pair of external nozzle assemblies 44 positioned on diametrically opposed sides of the vehicle. Each of these assemblies includes four nozzles 45a–d which are fixed and orientated at 90° with respect to each other. Each of these nozzles is connected to a central supply conduit 46 through which a suitable propulsion fluid is supplied to the individual nozzles from a source (not shown) contained within the excursionary vehicle. The nozzle assemblies further include individual valves 48a–d which permit individual regulation of each of the nozzles whereby the orientation and the direction of propulsion of the excursionary vehicle may be controlled by the astronaut located therein.

In addition to effecting control of the excursionary vehicle per se, the present invention further contemplates the control of the mother vehicle by the astronaut located within the excursionary vehicle although it is to be understood that additional astronauts may also be carried by the mother vehicle and exert control over the operation thereof. In order to permit the astronaut within the excursionary vehicle to control the trajectory and attitude of the mother vehicle, an electrical interlocking system 50 is provided between suitable controls located in the excursionary vehicle and the solenoid valves 19 which control the operation of the nozzles 16. This system includes a pneumatic or hydraulic motor 52 positioned at the right-hand end of the excursionary vehicle as viewed in FIGURE 2. A control valve 53 controls the admission and exhausting of motive fluid so as to extend or retract rod 54 which carries a head 56 having a plurality of male plugs 58. The plugs are adapted to be received within female receptacles provided in member 59 when the head 56 is extended, electrical interconnection between the controls within the excursionary vehicle and plugs 58 being accomplished through a flexible cable 60. Of course, it is to be understood that the plurality of electrical channels provided by plugs 58 are connected through cable 61 to the solenoid valve 27 controlling motor 24 as well as to valves 19 controlling the operation of motors 18.

Lastly, a plurality of visual ports 64 and a hatch 68 containing an additional port 66 are provided in one end of the excursionary vehicle as shown in FIGURE 3 and it is to be understood that additional ports are also provided in the opposite end of the vehicle. A hatch 35 is also provided in the circumferential wall of the excursionary vehicle and hatches 31 and 33 are provided in well structure 30. Thus, the astronaut may leave the excursionary vehicle and effect inspection and/or repair of the mother vehicle if such becomes necessary during flight.

The operation of the vehicle system will be apparent from the preceding description. When the mother vehicle has reached a predetermined location such as an orbital path about the moon or a planet, the astronaut first opens hatch 20 by energizing solenoid valve 27 so as to actuate motor 24, solenoid valve 27 being operatively connected to the controls within the excursionary vehicle through the electrical interconnection provided by system 50. Once the hatch is open, the astronaut may then actuate the valves associated with motors 52 and 38 so as to retract plugs 58 and legs 36, whereupon, the excursionary vehicle becomes detached from the mother vehicle and may then depart therefrom under the propulsion provided by nozzle assemblies 44 and the associated propellent system. Conversely, when the excursionary vehicle returns to the mother vehicle, ball bearings 40 guide the entrance of the vehicle into the well and, after the vehicle is properly orientated, legs 36 are fully extended into pockets 42. Thereafter, electrical connection is again established by the extension of head 56 and the plugs 58 into the receiving connectors. Thus, with communication again established with the mother vehicle, the hatch 20 may be closed and the trajectory of the mother vehicle may then be controlled by the suitable orientation of nozzles 16 since motors 18 are also under the control of the astronaut through the electrical connection 50.

Figure 4:
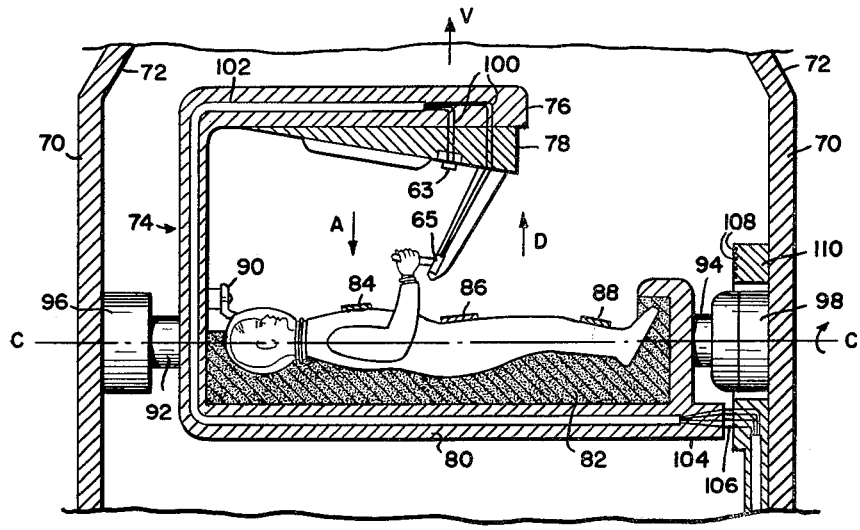
FIGURE 4 is a sectional view of a space vehicle in combination with a first form of rotary mechanism for enabling the astronaut to tolerate substantially increased acceleration and deceleration forces.

Turning now to the aspects of the invention relating to the reduction of the effects of acceleration and deceleration forces on the astronaut, reference is made to FIGURE 4 which illustrates the principles of the present invention as employed in combination with a space vehicle of any configuration, the outer walls of the vehicle being indicated at 70. For example, the configuration of the space vehicle may be that of the presently designed Mercury or Apollo capsules as well as that of other proposed systems such as the Dyna-soar Space Glider or other future vehicles of different configuration.

In the illustrated example, walls 70 of the vehicles are shown to be tapered at 72 and it is to be understood that the tapered portion indicates the forward or leading portion of the vehicle when it is in flight. That is, the direction of the vehicle's velocity is indicated by arrow V. It will therefore be apparent that the effect of vehicle acceleration on the astronaut results in a force acting in the direction of arrow A, whereas, deceleration of the vehicle results in a force acting on the astronaut in the direction of arrow D. Thus, the present invention contemplates the rotation of the astronaut about an axis indicated by line c—c which is perpendicular to the direction of velocity as well as the directions of the acceleration and deceleration forces. As a result of rotation about this axis, the blood and internal organs of the astronaut will be subjected to a displacing force in a given direction for only a brief interval of time and, since the astronaut is rotated through a full 360°, the net result of the forces will be zero for each revolution. It will therefore be apparent that neither the blood nor the internal organs will be greatly displaced in any given direction which might prove to be harmful, but rather, the blood and internal organs will tend to oscillate only slight amounts in each direction as the astronaut is rotated. Insofar as the rate of rotation is concerned, the optimum angular velocity of rotation of the astronaut is dependent upon the magnitude of the acceleration and deceleration forces which, in turn, are dependent upon the maximum or optimum values from the standpoint of rocket efficiency and the distance which is to be traversed by the space vehicle. Of course, the maximum angular velocity of rotation must be maintained at a value which will not cause undesirable centrifugal forces to adversely effect the astronaut's circulatory system or the other internal organs. For example, it is desirable that the maximum magnitude of centrifugal force be less than the force of gravity on earth so as to insure maximum comfort for the astronaut.

In the form of the invention shown in FIGURE 4, the rotary mechanism includes a rigid frame member 74 having a first portion 76 which carries a control panel 78, the latter preferably extending circumferentially about the astronaut for approximately 180°. Frame member 74 further includes a second, integral portion 80 which surrounds the astronaut on three sides and to which is secured a removable liner 82 the latter of which is contoured to fit the requirements of an individual astronaut. The astronaut is secured in the horizontal position by means of a plurality of straps 84, 86 and 88 as well as a helmet lock 90 secured to frame member 74. The straps are preferably secured to the frame portion 80 by removable clips so that, during periods of non-acceleration or deceleration, the astronaut may uncouple the straps and unlock the helmet lock 90 so as to leave the contoured seat and move about the space craft if there is sufficient room therein for this purpose.

The entire astronaut support structure and control panel is mounted for rotation about axis c—c by means of a pair of shafts 92 and 94 rigidly secured to opposite ends of frame 74. Shaft 92 is journalled in a radial and axial thrust bearing indicated at 96 which is secured to the vehicle wall 70. Shaft 94 is connected to a conventional motor and brake unit 98 so that the entire assembly may be rotated during periods of acceleration or deceleration and secured against rotation during periods of non-acceleration or deceleration.

In order to permit the astronaut to control various functions of the space vehicle such as the orientation of propellent nozzles, the various control switches, two of which are shown at 63 and 65, are connected through electrical leads 100 and cable 102 to a wiper arm 104 carrying a plurality of contacts 106. Contacts 106 frictionally engage a plurality of slip rings 108 secured in a stator member 110 secured to the vehicle wall 70. Of course, it is to be understood that the various communication channels provided by contacts 106 are electrically connected to suitable control mechanisms such as valves 19 or 48 for controlling the attitude and trajectory of the space vehicle the latter of which may be either a mother vehicle such as vehicle 12 or an excursionary vehicle such as 34.

Figure 5:
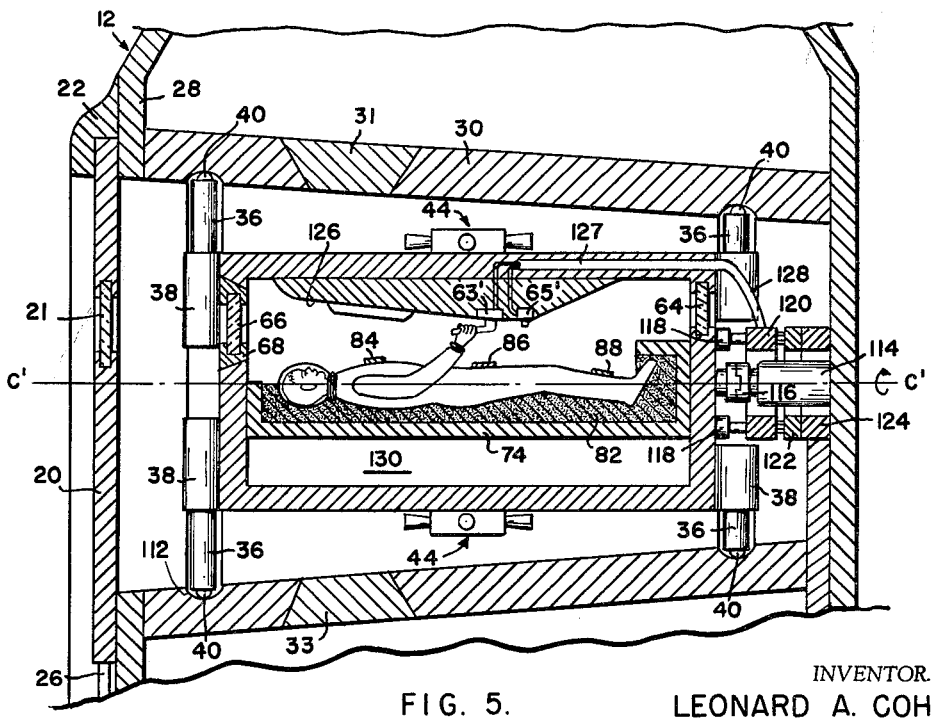
FIGURE 5 is a sectional view of a portion of the space vehicle system shown in FIGURE 2 in combination with an alternative form of rotary mechanism.

Reference is now made to FIGURE 5 which illustrates a preferred emobdiment of the present invention which incorporates the advantages of the lateral access vehicle system described with regard to FIGURES 1–3 as well as the advantages of the rotating system just described. Those elements shown in FIGURE 5 which are identical to previously described elements of FIGURES 1–3 are correspondingly numbered and, include the mother vehicle 12 having a sliding hatch 20 which permits the entrance and departure of the excursionary vehicle 34, hatch 20 including a visual port 21 aligned with port 66. Vehicle 34 further includes the previously described retractable legs 36 having bearings 40, however, it is to be noted that the previously described pockets 42 are replaced by annular grooves 112 so that the entire excursionary vehicle is capable of rotation about the axis c'—c'. Since the entire vehicle 34 is adapted to rotate as a unit, frame 74 is merely secured to the vehicle wall so as to rotate therewith, the rotation being supplied by motor 114 which is coupled to the excursionary vehicle by means of an axially separable clutch 116.

In order to maintain electrical communication between the excursionary vehicle and the mother vehicle when the two are in the assembled condition illustrated in FIGURE 5, a pair of hydraulic or pneumatic motors 118 are provided so as to reciprocate an annular member 120 carrying a plurality of male connectors as described with reference to the FIGURE 2 embodiment. However, since the excursionary vehicle is to rotate with respect to the mother vehicle, the aforementioned contacts are adapted to be received in an annular ring 122 which is rotatably connected to a stator ring 124, such slip rings being well known in the art. Of course, it is to be understood that stator ring 124 is electrically connected through suitable leads to the valves controlling motors 18 and 24 as shown in FIGURE 1 while ring 120 is electrically connected to the control switches 63' and 65' contained on panel 126 through cable 127 and flexible conduit 128. It will also be understood that the vehicle is provided with all of the necessary life supporting equipment and the necessary propulsion fluid source all of which may be located within chamber 130.

From the foregoing description of the structural elements it will be apparent that the present invention provides a vehicle system wherein the excursionary vehicle may function in a dual capacity. That is, it may function as a separate vehicle capable of excursions independently of the mother vehicle as, for instance, in landings or close surveillance of a celestial body while the mother vehicle remains in orbit thereabout. At the same time, the excursionary vehicle is capable of becoming a functional and operative control center for the operation of the mother vehicle due to the electrical coupling assemblies described hereinabove. Furthermore, and most importantly, the configuration of both vehicles is specifically designed so as to secure the substantial increase of rocket efficiency due to the fact that the astronaut may be rotated in the above described manner so as to greatly reduce the serious physiological effects of prolonged periods of acceleration and deceleration. Thus, the present invention while encompassing features which may be used independently of each other, is specifically designed so that all of the desirable features may be combined to form the preferred embodiment illustrated in FIGURE 5.

It will also be noted that the lateral access arrangement permits the excursionary vehicle to be ejected from the mother ship during any stage of flight as well as in the event of an abortive launching of the system. In addition it will be readily apparent that the astronaut and the various systems contained within the excursionary vehicle may be more thoroughly and rapidly checked out in a laboratory entirely apart from the mother vehicle prior to the placement of the excursionary vehicle in the latter.

Of course, numerous changes and modifications may be made without departing from the scope of the invention. For example, electric motors may be readily substituted for motors 24, 38, 52 and 118 so that the associated control valves may be eliminated. Of course, it is to be understood that the electrical interconnection provided by system 50 is also capable of interconnecting the control panel in the excursionary vehicle with the various known indicators commonly provided for the purpose of indicating the pressure, temperature and fuel conditions of the mother vehicle. Furthermore, it will be readily apparent that any number of astronauts may be rotated in the above described manner either about independent axes or axially spaced along the same axis. Alternatively, a plurality of astronauts may be positioned in a back-to-back relationship with the axis of rotation passing therebetween. Thus, it is to be understood that the foregoing description is intended to be merely illustrative of the principles of the present invention and that numerous changes and modifications may be made therein without departing from the scope of claims as hereinafter set forth.

What is claimed is:

1. A space vehicle system comprising a mother vehicle and an excursionary vehicle, said mother vehicle including a forward section, a mid section and an aft section, propulsion means positioned in said aft section, a well located in said mid section opening to the exterior of said vehicle, said excursionary vehicle being of a size so as to be received within said well so as to be carried by said mother vehicle, said excursionary vehicle including self-contained propulsion means for propelling said excursionary vehicle out of and independently of said mother vehicle, control means within said excursionary vehicle for operating said mother vehicle propulsion means, separable connector means for connecting said control means with said mother vehicle propulsion means when said excursionary vehicle is within said well, means for rotatably supporting said excursionary vehicle within said mother vehicle, and means for rotating said excursionary vehicle relative to said mother vehicle about an axis perpendicular to the direction of flight of said mother vehicle.

2. A space vehicle system comprising a mother vehicle and an excursionary vehicle constructed to be carried by said mother vehicle and for independent excursionary flights from and return to said mother vehicle, said mother vehicle including a forward section, a mid section and an aft section, propulsion means positioned in said aft section, a well located in said mid section opening to the exterior of said vehicle, means defining an opening in the side of said mid section providing a passage for lateral movement of said excursionary vehicle between said well and the exterior of said mother vehicle, said excursionary vehicle being of a size so as to be received within said well and carried by said mother vehicle therein, said excursionary vehicle including self-contained propulsion means for propelling said excursionary vehicle out of and independently of said mother vehicle for excursionary trips and return to said mother vehicle, control means within said excursionary vehicle for operating said mother vehicle propulsion means and separable connector means for connecting said control means with said mother vehicle propulsion means when said excursionary vehicle is within said well.

3. A space vehicle system as claimed in claim 2 comprising means operable from within said excursionary vehicle for connecting and disconnecting said connector means, and hatch means for covering said opening, said hatch means being movable to uncover said opening.

4. A space system as claimed in claim 2 wherein said connector means comprises electrical connectors.

5. A space vehicle having propulsion means for accelerating said vehicle in a given direction, means for supporting an astronaut within said vehicle, means for rotating said supporting means and said astronaut about an axis perpendicular to the direction of said acceleration so as to constantly change the direction of acceleration forces with respect to the internal organs of said astronaut, control means connected to said propulsion means for controlling the trajectory of said vehicle, and means for rotating said control means about said axis at a rate of rotation equal to that of said astronaut.

6. A space vehicle system comprising a vehicle, propulsion means for providing acceleration to said vehicle in a given direction, means for supporting an astronaut on said vehicle, means for rotating said supporting means and said astronaut supported thereby about an axis perpendicular to the direction of said acceleration so as to change constantly the direction of acceleration forces with respect to the internal organs of said astronaut, and control means for effecting control over flight conditions of the vehicle system, said control means being mounted on said supporting means for rotation therewith and for access to said astronaut during rotation of said supporting means.

7. In combination, a first space vehicle, a second space vehicle removably containing said first vehicle, said second space vehicle having propulsion means for accelerating the same in a given direction, means for supporting an astronaut within said first vehicle, and rotating means connected between said first and second vehicles so as to rotate said first vehicle, said support means and said astronaut relative to said second vehicle about an axis perpendicular to the direction of said acceleration so as to change constantly the direction of acceleration with respect to the internal organs of said astronaut.

References Cited by the Examiner
UNITED STATES PATENTS

| 2,399,217 | 4/46 | Fahrney | 244—2 |
| 2,985,413 | 5/61 | Widmanstetter | 244—140 |
| 3,010,219 | 11/61 | Schueller | 35—12 |
| 3,053,476 | 9/62 | Mohar | 244—1 |
| 3,073,040 | 1/63 | Schueller | 244—1 |

FERGUS S. MIDDLETON, *Primary Examiner.*

RALPH D. BLAKESLEE, MILTON BUCHLER,
*Examiners.*